United States Patent [19]
Sandrock

[11] 3,863,782
[45] Feb. 4, 1975

[54] SELF-LOADING ARTICLE TRANSPORT VEHICLE

[75] Inventor: Dale D. Sandrock, Pekin, Ill.

[73] Assignee: Caterpillar Tractor Co., Peoria, Ill.

[22] Filed: July 2, 1973

[21] Appl. No.: 375,482

[52] U.S. Cl................. 214/75 H, 212/74, 214/77 R
[51] Int. Cl............................................. B60p 1/54
[58] Field of Search.......... 214/10.5 R, 75 H, 75 R, 214/77 R; 280/179 R; 212/13, 14, 15, 8 R, 74; 105/366 R, 368 R, 377; 296/100; 248/119 R, 361 R

[56] References Cited
UNITED STATES PATENTS

| | | | |
|---|---|---|---|
| 1,464,131 | 8/1923 | Goodger | 214/75 H |
| 2,531,140 | 11/1950 | Linde | 296/100 |
| 3,052,365 | 9/1962 | Cameron | 214/75 H |
| 3,072,271 | 1/1963 | Costello | 212/12 |
| 3,211,306 | 10/1965 | Nissen et al. | 214/75 H |
| 3,485,392 | 12/1969 | Lofgren | 214/77 R |
| 3,540,171 | 11/1970 | Kumnick et al. | 105/377 |

Primary Examiner—Robert J. Spar
Assistant Examiner—Lawrence J. Oresky
Attorney, Agent, or Firm—Caterpillar Tractor Co.

[57] ABSTRACT

A self-loading article transport vehicle includes a load carrying bed, a collapsible frame mounted on the vehicle in a substantially upstanding loading disposition above the bed, a load transfer apparatus mounted on the frame for loading articles onto the bed and for unloading articles therefrom, and wherein the frame is lowerable to a position restraining movement of the articles on the bed.

14 Claims, 5 Drawing Figures

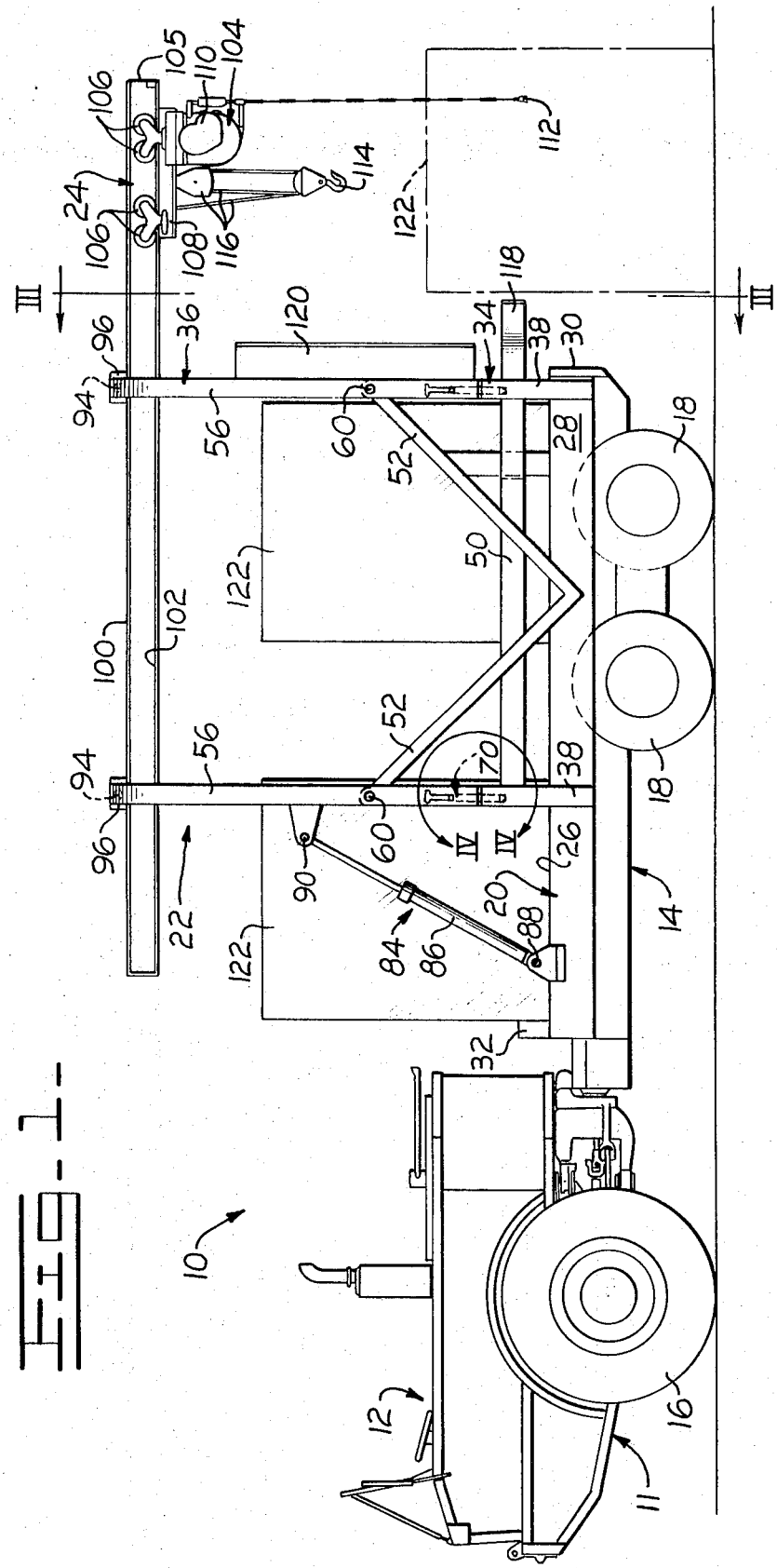

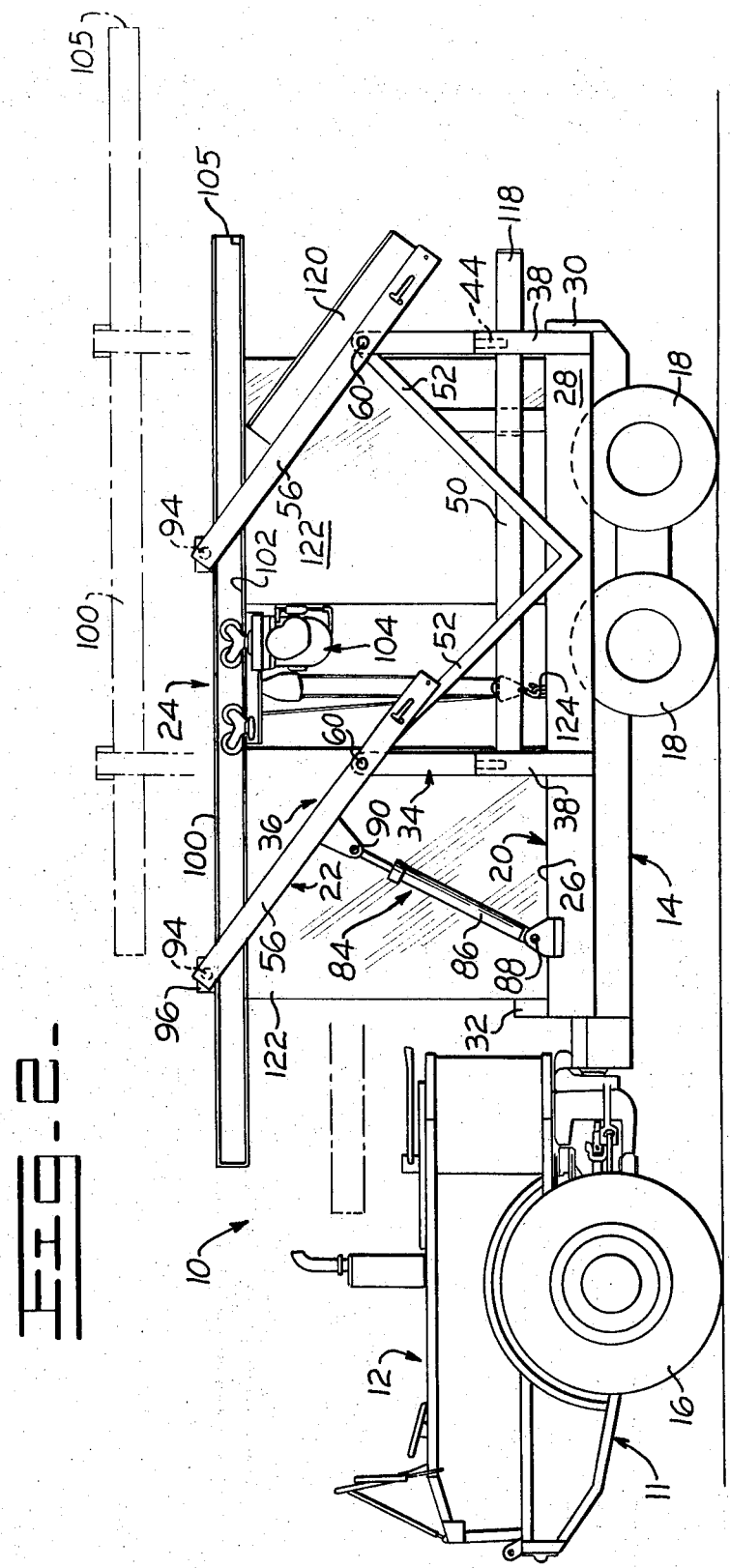

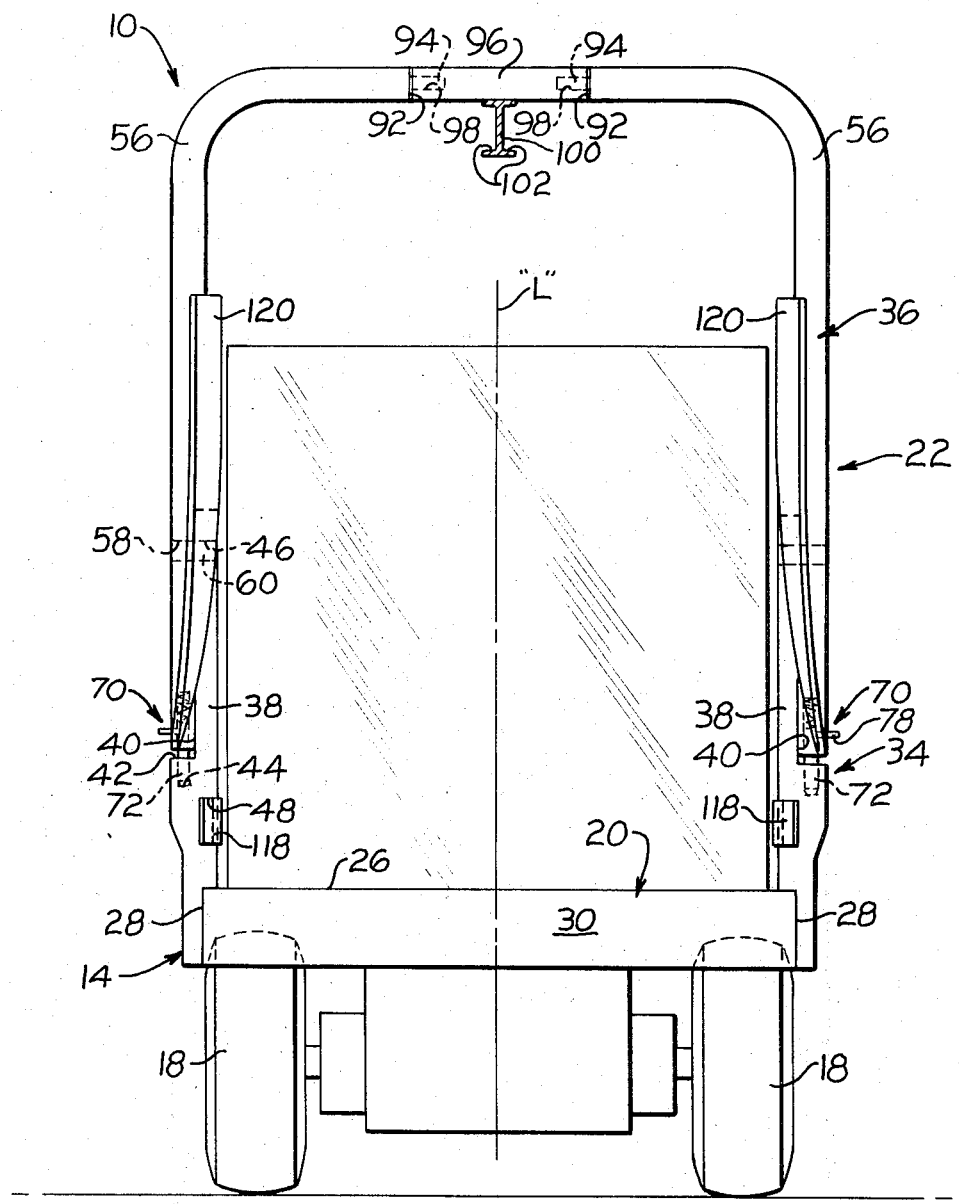

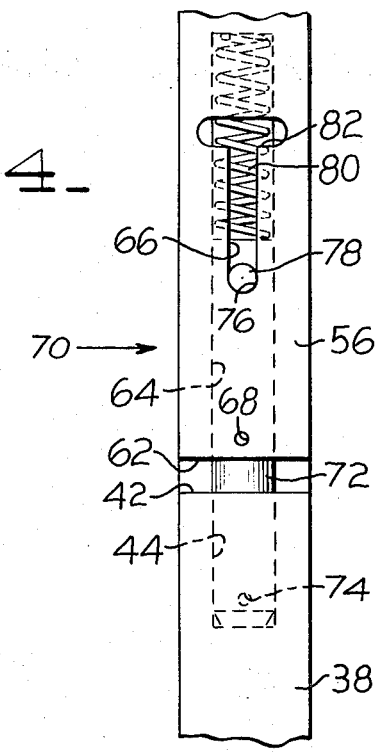
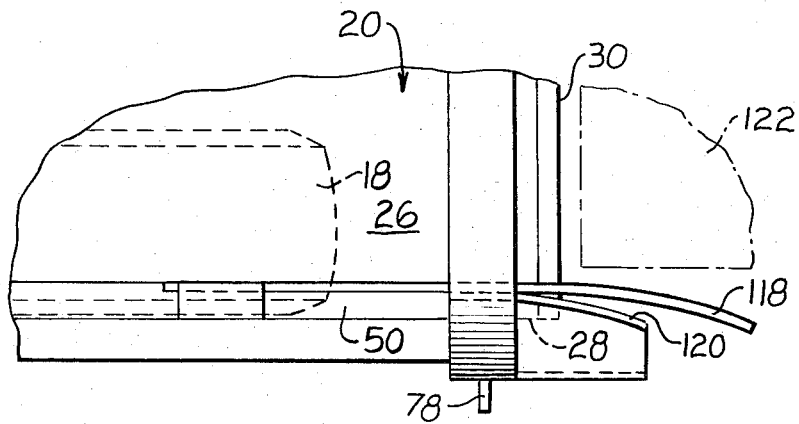

SELF-LOADING ARTICLE TRANSPORT VEHICLE

BACKGROUND OF THE INVENTION

During the loading and unloading of relatively large articles such as containers of predetermined standard sizes onto and from the bed of a flat bed truck or the like, auxiliary material transporting equipment is usually needed. Unfortunately, motorized auxiliary equipment such as fork lift trucks and cranes require additional operating personnel and are expensive to maintain in order to be available when and where needed. Therefore, the subject invention relates generally to a self-loading article transport vehicle which obviates the need to maintain auxiliary material transporting equipment available for the cargo loading and unloading operation and generally lends itself to a one-man operation.

Heretofore, many self-loading transport vehicles have presented an appreciable overall height due to the loading and unloading mechanism mounted on the vehicle. This can restrict the ability of the vehicle to travel through standard tunnel clearances.

Many other self-loading transport vehicles have mechanisms incorporating a relatively complex assemblage of extendible hydraulic cylinders and associated linkages which serve to limit the loading area. Still other vehicles employ devices that impose asymmetric forces on the vehicle during the loading operation which adversely affects the stability of the vehicle.

Another problem with self-loading vehicles occurs after the articles are loaded. At that time the loading mechanism must be suitably secured for traveling and the cargo must be tied down extensively by the operator using chains, ropes and other associated methods which is a tedious timeconsuming procedure.

Examples of self-loading transport vehicles experiencing problems of the above-identified types are U.S. Pat. Nos. 2,911,118 to Mr. R. P. J. Tapp; 2,927,704 to Mr. J. M. Condon; 3,072,271 to Mr. D. R. Costello; 3,404,793 to Mr. A. A. Pinkert; 3,513,997 to H. W. Heyer et al.; and 3,515,295 to Mr. K. Klaus.

SUMMARY AND OBJECTS OF THE INVENTION

Accordingly, it is an object of this invention to provide a self-loading article transport vehicle better adapted to load relatively large objects such as standardized containers and the like.

Another object of this invention is to provide such a self-loading article transport vehicle having a loading frame which can be lowered from an elevated loading position to reduce overall vehicle height during transport.

Another object of this invention is to provide a self-loading article transport vehicle of the character described in which the loading frame is effective dependably to retain the cargo loaded on the bed of the vehicle during transport so that the usual extensive cargo ties are virtually eliminated.

Other objects and advantages of the present invention will become more readily apparent upon reference to the accompanying drawings and following description.

BRIEF DESCRIPTION OF THE DRAWINGS

FIG. 1 is a side elevational view of the selfloading article transport vehicle of the present invention in a cargo loading mode of operation.

FIG. 2 is a side elevational view of the selfloading article transport vehicle of the present invention similar to FIG. 1 but in a material transporting mode of operation.

FIG. 3 is a rear elevational view of the selfloading article transport vehicle of the present invention taken along the line III—III of FIG. 1.

FIG. 4 is an enlarged fragmentary side elevational view of a locking mechanism associated with the loading frame of the present invention taken from the area identified within the circular line IV—IV of FIG. 1.

FIG. 5 is a fragmentary plan view of the rear of the self-loading article transport vehicle of the present invention showing article funneling guides associated with the frame thereof.

DESCRIPTION OF THE PREFERRED EMBODIMENT

Referring more particularly to the drawings, a self-loading article transport vehicle 10 embodying the principles of the present invention includes a forwardly disposed tractor portion 11 having an operator station 12 with the usual power plant and transmission mechanism (not shown). The vehicle further includes a rear load carrying portion 14 and is supported by ground engaging wheels 16 and 18, respectively. The load carrying portion of the vehicle generally includes a load carrying bed 20, a collapsible load restraining frame 22, and a load transfer apparatus 24.

More particularly, the load carrying bed 20 is elongated in a direction parallel to a vertical plane L passing centrally longitudinally of the article transport vehicle 10, as best shown in FIG. 3. The load carrying bed includes an upper surface or deck 26 transversely symmetrically terminating from the central plane L in sides 28, and longitudinally rearwardly terminating in an end 30. The opposite or forward end of the deck 26 terminates with an article stop member 32, as best shown in FIG. 1.

The collapsible load restraining frame 22 is supported on the load carrying bed 20 and includes a substantially upright rigid lower frame portion 34 and an inverted U-shaped upper pivotal frame portion 36. The rigid lower frame portion 34 includes a pair of longitudinally spaced, upright legs 38 on each side of the load carrying bed 20 in transversely spaced symmetrical relation with respect to the central longitudinal plane L. Such legs are substantially aligned with and secured to the bed adjacent the bed sides 28, as best shown in FIG. 3. Each of the legs includes an outwardly facing recess 40 defining an upwardly facing steplike surface 42 from which a downwardly extending socket 44 is formed. Further, each of the legs includes a transversely disposed pivot pin receiving bore 46 therein, and each of the rearwardly disposed legs includes an inwardly facing guide receiving recess 48 therein. In order to give additional rigidity and structural strength to those legs arranged on one side of the article transport vehicle 10, a longitudinal brace 50, and a pair of diagonal braces 52 are rigidly secured thereto and to the bed 20.

The inverted U-shaped upper frame portion 36 of the subject invention is pivotally mounted on the upright rigid lower frame portion 34. More specifically, the inverted U-shaped frame portion 36 includes an upwardly and inwardly extending curved arm 56 which is alignably received in each of the leg recesses 40 when the frame is in an upright position. Each arm has a transverse bore 58 adapted to receive a pivot pin 60 so that the pivot pin extends inwardly to be received within the bore 46 of the leg 38.

As best shown in FIG. 4, in the upright position of the arms 56, a downwardly facing surface 62 is disposed in vertically closely spaced facing relation to the upwardly facing surface 42 of the legs 38. A socket 64 extends upwardly from the surface 62 within each arm and a T-shaped handle receiving groove 66 opens outwardly therefrom, as does also a dowel pin receiving hole 68. With the sockets 44 and 64 in substantially vertical alignment, a locking mechanism 70 is provided to rigidly secure the arm to the leg. The locking mechanism includes a locking pin 72 which is received in both sockets in the locking mode of operation. Each of the locking pins has a lower dowel pin hole 74 and an upper handle receiving bore 76 in parallel alignment therewith.

When the locking pin 72 is disposed in its lowered position as shown in FIG. 4, the handle receiving bore 76 is substantially aligned with the lowest portion of the T-shaped groove 66 in order that an outwardly extending handle or bar 78 may be pressed into the locking pin bore 76. A compression spring 80 is disposed within the socket 64 in downwardly engaging relation against the locking pin to assure positive locking of the pin in the socket 44. The outwardly extending handle 78 enables manual movement of the locking pin upwardly against the compression spring to a point where the handle seats on a shoulder 82 within the T-shaped groove 66. In such upwardly fully retracted position of the locking pin, a dowel (not shown) can optionally be inserted in the aligned dowel pin holes 68 and 74 to more permanently disable the locking mechanism 70 by preventing downward extension of the locking pin from within the arm 56.

With reference to FIGS. 1 and 2, a powered positioning device shown generally by the reference numeral 84 is used to pivotally raise and lower the arms 56 on the legs 38 of the article transport vehicle 10. Such positioning device preferably includes a pair of extendible and retractable hydraulic cylinders 86 individually pivotally secured to the load carrying bed 20 on opposite sides thereof as by a pivot pin 88 and to one of the arms 56 by a pivot pin 90.

As best shown in FIG. 3, the upper inwardly facing extremity of each of the curved arms 56 terminates at an end face 92, and from which face a pivot pin 94 integrally inwardly extends. A transverse beam 96 provided with outwardly facing opposite sockets 98 is spannably aligned between the arms in such a manner that the pivot pins 94 are received within the sockets. The transverse beam is symmetrically positioned with respect to the longitudinal plane L, and with the oppositely disposed arms collectively define the inverted U-shaped upper pivotal frame portion 36 from which a longitudinally oriented track or rail 100 depends. The track is a part of the collapsible load restraining frame 22 serving to interconnect the pair of inverted U-shaped frame portions 36 and coacts therewith to form a retractable parallelogram linkage system. The track has symmetrically opposite outwardly facing channels 102 adapted to rollably support a conventional hoist mechanism shown generally by the reference numeral 104, and the track rearwardly terminates at an end 105 which extends longitudinally outwardly of the bed end 30 when the load restraining frame 22 is in its upright position as best shown in FIG. 1.

The hoist mechanism 104 is dependingly supported for longitudinal movement along the central plane L on the channels 102 of the track 100 by a plurality of rollers 106 mounted on a hoist carriage 108. A reversible motor 110 is supported by the carriage 108 and is actuated by a manually operated depending control line 112 or the like. The reversible motor may be air operated, electrically operated, or mechanically powered to lower or raise a hook 114 which is suspended from the carriage through a conventional sheave and cable or chain system 116.

As best shown in FIGS. 1, 3, and 5, the self-loading article transport vehicle 10 further preferably includes a pair of longitudinally oriented, lower article funneling guides 118 which are flexibly secured to the rear upright legs 38 and the braces 50. In addition, the rear arms 56 of the collapsible load restraining frame 22 flexibly support a pair of inwardly facing, substantially vertically arranged upper article funneling guides 120. When an article or large container 122 is supportably carried by the hook 114 of the hoist mechanism 104, the lower guides 118 and upper guides 120 serve to centrally position the article above the load carrying bed 20 so that it can be easily moved forwardly as the rollers 106 travel in the channels 102 to a position where the article may be lowered onto the deck 26.

OPERATION

While the construction and operation of the present invention are clearly apparent from the foregoing description, further amplification will subsequently be made in the following brief summary of such operation.

With the collapsible load restraining frame 22 disposed in its fully raised position and with the locking mechanism 70 engaged as shown in FIG. 4, the rearward end 105 of the track 100 and the hoist mechanism 104 is disposed considerably longitudinally outwardly of the load carrying bed 20 to a position directly above the large container 122 to be loaded, as shown in FIG. 1. Through suitable ropes, grappling devices or the like (not shown), the container is secured to the hook 114 and the motor 110 actuated by manipulation of the control line 112. The container is raised and urged forwardly whereupon the guides 118 and 120 serve to centrally position and funnel the cargo container above the load carrying bed 20 and centrally of the inverted U-shaped upper pivotal frame portion 36 to the desired position on the deck 26 of the transport vehicle.

The vehicle 10 is particularly adapted for transporting a pair of the relatively large heavy containers 122 in which instance the containers are preferably longitudinally spaced on the forward and rearward portions of the deck 26 leaving a space therebetween to accommodate the hoist mechanism 104 therebetween. In this way the containers serve to preclude inadvertent rolling of the hoist along the track 100 during transport. The locking mechanism 70 is released from the safety condition by urging the handle 78 upwardly in the T-shaped groove 66 shown in FIG. 4 until the handle is engaged with the shoulder 82 in a position corresponding to the fully retracted position of the locking pin 72.

With the locking mechanism 70 disengaged, the curved arms 56 of the inverted U-shaped upper pivotal frame portion 36 are no longer rigidly secured to the legs 38. In such a condition, the hydraulic cylinders 86 may be retracted to collapsibly lower the load restraining frame 22 to a position corresponding to that shown in FIG. 2 wherein the longitudinal track 100 rests on the containers and serves to clampingly secure the containers to the deck 26. The hydraulic cylinders can also be maintained in a condition to continually apply a predetermined downward pressure on the containers for improved clamped retention thereof.. At this stage, the hook 114 of the hoist mechanism 104 may be lowered to a position where the hook can be engaged under light tension with a retractably mounted ring 124 secured to the load carrying bed 20 to thereby restrict movement of the hoist during travel. In this transporting mode of operation, the cargo containers are substantially closely surrounded by the various members of the rigid frame portion 34 and the pivotal frame portion 36, as well as the longitudinal track 100. This cargo movement restraining capability of the frame of the present invention substantially negates the need for chains, ropes, and similar externally applied hold-down devices which are normally associated with transport vehicles of this type.

As best shown in FIG. 2, the collapsible load restraining frame 22 of the present invention is lowered appreciably from its upwardly disposed loading mode of operation shown in phantom lines. In this condition also the overall length of the vehicle is reduced as may be noted by the automatically inwardly retracting disposition of the rearward end 105 of the track 100 with respect to the bed 20 during the lowering movement of the load restraining frame. Further, the pivotal frame portion 36 may be lowered additionally when smaller containers 122 are carried or when the vehicle is roading in the empty mode of operation to a position shown in broken lines in FIG. 2 immediately above the tractor portion 11.

A still further advantage of the self-loading article transport vehicle of the present invention is its ability to load large containers or the like while maintaining vehicle stability during the loading operation. This is in sharp contrast to many commercially available systems which must load from one side of the vehicle, imposing sometimes dangerous overturning moments on the vehicle.

While the invention has been described and shown with particular reference to the preferred embodiments, it will be apparent that variations might be possible that would fall within the scope of the present invention, which is not intended to be limited except as defined in the following claims.

What is claimed is:

1. A self-loading article transport vehicle comprising;
   an elongated load carrying bed having a predetermined load receiving end;
   a frame pivotally mounted on said vehicle for movement between a substantially rigid, upstanding load receiving position above the bed and a collapsed load restraining position for articles on the bed;
   a longitudinally extended rail pivotally mounted centrally on said frame and having a load receiving end extending outwardly of said load receiving end of the bed when said frame is in said load receiving position;
   load transfer means longitudinally movably mounted on said rail and having a load engaging member elevationally extendably retractably movable relative to the rail for permitting articles to be loaded onto and removed from the bed; and
   means for pivotally swinging said frame to its collapsed position automatically to lower said rail downwardly and to swing its load receiving end inwardly of the bed in tightly clamping load restraining engagement against articles on the bed.

2. The self-loading article transport vehicle of claim 1 wherein said frame includes inverted U-shaped frame means pivotally lowerably mounted on said vehicle in substantially straddling relation to the articles on the bed.

3. The self-loading article transport vehicle of claim 2 wherein said means for pivotally swinging said frame to its collapsed position includes extendible and retractable piston means pivotally disposed between said inverted U-shaped frame means and said vehicle to reduce its elevational height during vehicle travel and to raise said frame for loading.

4. The self-loading article transport vehicle of claim 3 including releasable locking means disposed between said vehicle and said U-shaped frame means for substantially rigidly holding said frame means in its upstanding load receiving position.

5. The self-loading article transport vehicle of claim 4 including guide means on the vehicle for funneling articles centrally under said frame during loading and placement of the articles on the bed.

6. A self-loading article transport vehicle, having a central longitudinal axis, comprising:
   a load carrying bed;
   a frame pivotally mounted on the vehicle on a plurality of pivot axes disposed substantially transversely to said longitudinal axis of the vehicle;
   a rail pivotally mounted on said frame generally above said bed and lying in a substantially vertical plane passing through said axis of the vehicle;
   a hoist movably mounted on said rail and being connectable to an article disposed remotely outwardly from the vehicle for raising and lowering the article and adaptable to travel along said rail for longitudinally moving the article relative to the vehicle for placing the article on and removing the article from the bed; and
   a hydraulic jack for swinging said frame from a generally upright article loading position to a lowered article transporting position wherein said frame and said rail serve to restrain movement of the article on the bed, said rail having an end extending longitudinally outwardly from the vehicle when said frame is in its upright loading position with the end of said rail being automatically retracted inwardly over the bed during movement of said frame to its lowered position.

7. The self-loading article transport vehicle of claim 6 wherein said frame includes a pair of longitudinally spaced, substantially parallel inverted U-shaped frame members pivotally supporting said rail to form a retractable parallelogram linkage system.

8. The self-loading article transport vehicle of claim 7 including releasable locking means intermediate said inverted U-shaped frame members and the vehicle for rigidly securing said frame in said upright article loading position.

9. A self-loading article transport vehicle comprising:
   an elongated load carrying bed having a longitudinal dimension;

a selectively collapsible load restraining frame having a plurality of legs pivotally mounted on said vehicle about a pair of axes being transverse to said longitudinal dimension in a substantially upright rigid loading position and including a single rail pivotally interconnecting said legs with the longitudinal axis of said rail being parallel to said longitudinal dimension of said bed;

article raising and lowering means movably mounted for longitudinal travel on said rail for placing articles on and removing them from the bed; and means for pivotally collapsing said frame to a lowered position for automatically retracting said rail inwardly of the bed and downwardly in tightly clamping article restraining engagement.

10. The self-loading article transport vehicle of claim 9 including releasable locking means disposed between said vehicle and said legs of the frame for substantially rigidly holding said frame in its upright loading position.

11. The self-loading article transport vehicle of claim 9 in which said article raising and lowering means is connectable to the bed when said frame is in its lowered position to tension said rail toward the bed and to restrain longitudinal movement of the raising and lowering means on the rail during vehicle travel.

12. A self-loading article transport vehicle, having a longitudinal axis, comprising;

an elongated load carrying bed;

a plurality of upright legs secured in transversely aligned pairs to the bed symmetrically on opposite sides of such a longitudinal axis and having a plurality of transverse pivot axes thereon;

a plurality of inverted U-shaped frame members individually pivotally secured to said transversely aligned pivot axes;

a rail pivotally interconnecting said frame members above the bed and lying in a substantially upright plane passing through said longitudinal axis for elevational movement in a substantially horizontal attitude during pivoting of said frame members relative to said legs;

a hoist movable longitudinally on said rail and connectable to articles for raising and lowering them and adaptable to placing such articles on and removing them from the bed;

releasable locking means disposed between at least one of said frame members and at least one of its associated legs for selectively maintaining the frame members in rigid substantially vertically aligned relation with their respectively associated legs; and a retractable and extendable hydraulic cylinder pivotally connected between the bed and one of said frame members for swinging said frame members, said rail, and said hoist from an elevated load supporting position during loading to a lowered article clamping position during vehicle travel.

13. The self-loading article transport vehicle of claim 12 wherein said one of said frame members and its associated leg individually have socket means defined therein and said releasable locking means includes a resiliently extendably biased locking pin disposed in one of said socket means for selective positive locking engagement within the other of said socket means.

14. The self-loading article transport vehicle of claim 13 wherein said releasable locking means includes disabling means to assure positively retracted inoperative positioning of said locking pin entirely within said one of said socket means.

* * * * *